（12） United States Patent
Masse

(10) Patent No.: US 9,732,399 B2
(45) Date of Patent: Aug. 15, 2017

(54) METHOD FOR PRODUCING METAL ZINC

(71) Applicant: ZincOx Resources PLC, Surrey (GB)

(72) Inventor: Antoine Masse, Lesdain (BE)

(73) Assignee: ZINCOX RESOURCES PLC, Surrey (GB)

( * ) Notice: Subject to any disclaimer, the term of this patent is extended or adjusted under 35 U.S.C. 154(b) by 879 days.

(21) Appl. No.: 13/757,468

(22) Filed: Feb. 1, 2013

(65) Prior Publication Data

US 2013/0220824 A1   Aug. 29, 2013

Related U.S. Application Data

(60) Provisional application No. 61/594,541, filed on Feb. 3, 2012.

(30) Foreign Application Priority Data

Feb. 3, 2012   (BE) .................................. 20120065

(51) Int. Cl.
   *C22B 19/02*   (2006.01)
   *C22B 3/00*   (2006.01)
   (Continued)

(52) U.S. Cl.
   CPC ............ *C22B 19/02* (2013.01); *C22B 3/0005* (2013.01); *C22B 3/0068* (2013.01); *C22B 7/007* (2013.01);
   (Continued)

(58) Field of Classification Search
   CPC ..... C22B 3/0005; C22B 3/0068; C22B 7/007; C22B 7/02; C22B 19/02; C22B 19/22; C22B 19/30; Y02P 10/234
   See application file for complete search history.

(56) References Cited

U.S. PATENT DOCUMENTS 4,274,931 A * 6/1981 Verbaan .................. C22B 19/26
                                                            205/608
4,401,531 A † 8/1983 Martin San Lorenzo
(Continued)

FOREIGN PATENT DOCUMENTS

EP        1361296 A1 * 11/2003   ........... C22B 3/0063
GB    BE 1015805 A3 *  9/2005   ........... C22B 3/0068

OTHER PUBLICATIONS

Diaz et al., "Improving Zinc Smelter Profitability, is Secondary Zinc the Solution? Use ZincexTM Solvent Extraction" International Symposium on Lead and Zinc Processing, PbZn 2010, 8 pages.†
(Continued)

*Primary Examiner* — Ciel Thomas
(74) *Attorney, Agent, or Firm* — McCracken & Gillen LLC

(57) ABSTRACT

A method for producing metal zinc by liquid/liquid extraction, comprising leaching of a zinc-bearing solid raw material containing antimony with a slightly acid aqueous solution, at a pH value maintained above 3 and less than or equal to 5, with formation of a suspension, drawing-off from the suspension of an aqueous phase containing zinc in solution to be subject to the extraction, additional leaching of the remaining suspension with an acid aqueous solution, at a pH value maintained below 3.5 and greater than or equal to 1, with formation of a pulp, introduction of a neutralizing agent in this pulp with coprecipitation of antimony and other impurities and separation from this neutralized pulp of a zinc-bearing aqueous solution which is recycled to the step for leaching the zinc-bearing solid raw material.

18 Claims, 1 Drawing Sheet

(51) Int. Cl.
*C22B 3/26* (2006.01)
*C22B 19/30* (2006.01)
*C22B 3/38* (2006.01)
*C22B 7/00* (2006.01)
*C22B 7/02* (2006.01)

(52) U.S. Cl.
CPC ............... *C22B 7/02* (2013.01); *C22B 19/22* (2013.01); *C22B 19/30* (2013.01); *Y02P 10/234* (2015.11)

(56) References Cited

U.S. PATENT DOCUMENTS

| | | | | |
|---|---|---|---|---|
| 4,610,720 | A | * | 9/1986 | Schmidt ............... C22B 5/04 75/10.48 |
| 6,696,037 | B1 | * | 2/2004 | Watanabe ........ C01B 17/0226 205/607 |
| 6,869,520 | B1 | † | 3/2005 | Martin San Lorenzo |
| 2004/0031356 | A1 | † | 2/2004 | Lorenzo |
| 2011/0100161 | A1 | * | 5/2011 | Marcadier ............... C22B 3/44 75/401 |
| 2011/0268632 | A1 | * | 11/2011 | Roth ...................... C22B 3/08 423/103 |

OTHER PUBLICATIONS

Frias et al., "Indirect bioleaching and ZINCEXtm process: a profitable marriage to process zinc polymetallic concentrates" Advanced Materials Research, vol. 71-73 (2009) pp. 429-432.†

Nogueira et al., "Using Zinc SEcondaries to Feed an Electrowinning Plant" Zinc '85, Proceedings of International Symposium on Extractive Metallurgy, Zinc 1985, Tokyo (Japan), Chapter 48, pp. 763-781.†

Fuls et al., "Water Reduction at Skorpion Zinc and the Impact on the Environment" The Southern African Institute of Mining and Metallurgy, Base Metals Conference 2009, pp. 307-322.†

* cited by examiner
† cited by third party

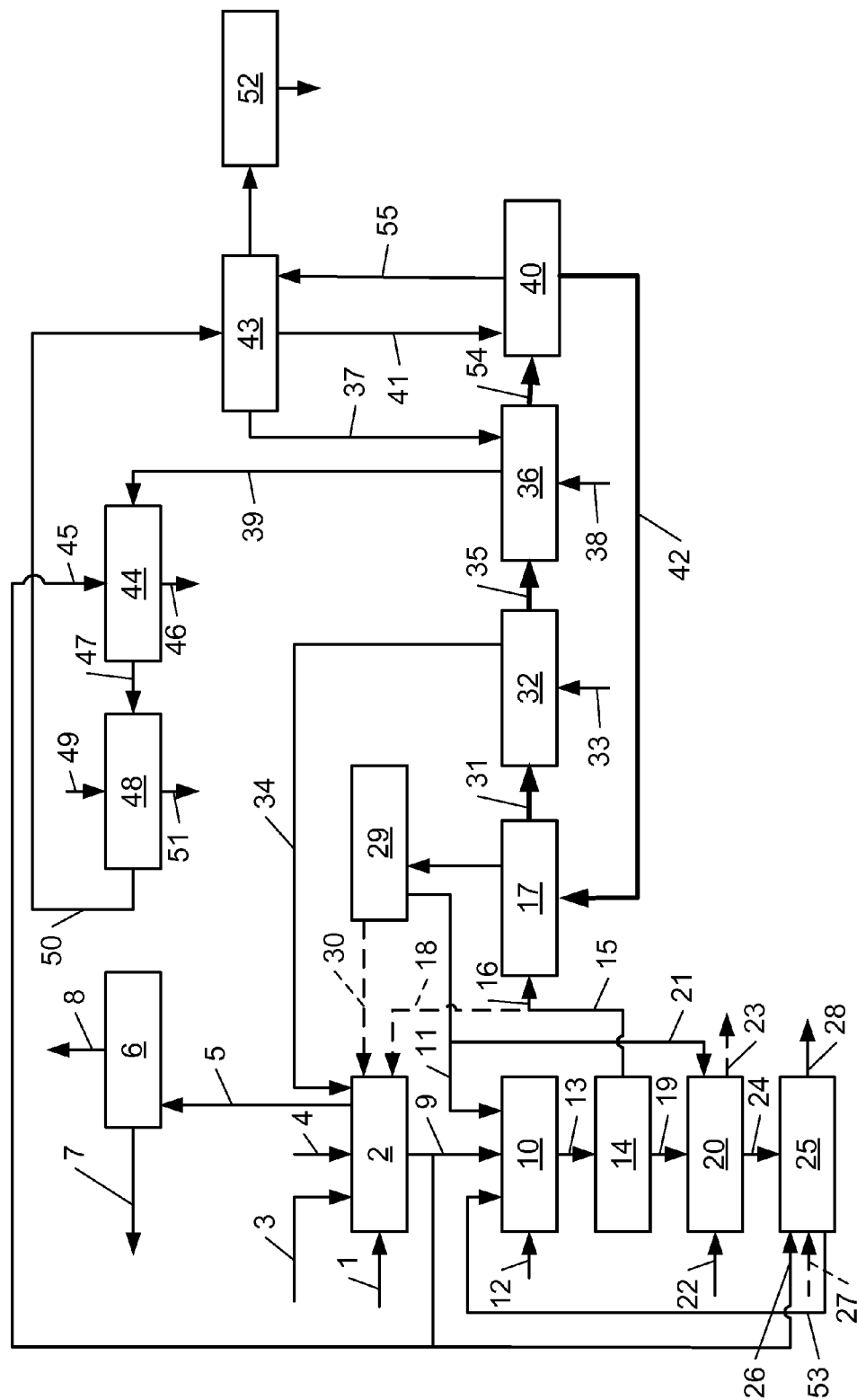

METHOD FOR PRODUCING METAL ZINC

The present invention relates to a method for producing metal zinc, comprising:
- extraction of zinc in solution in an aqueous phase with an acid organic solvent, with formation of an organic liquid phase loaded with zinc and of an acid aqueous raffinate,
- re-extraction of zinc from the organic liquid phase loaded with zinc, by means of an acid aqueous solution, and
- recovery of the re-extracted zinc from the acid aqueous solution by electrolysis.

Methods of this kind, called methods by liquid-liquid extraction have been known for a long time. The aqueous phase containing zinc in solution and subject to this extraction stems from leaching of a zinc-bearing solid raw material. As a raw material of this kind, mention may in particular be made of powdery materials, i.e., electric arc oven dusts, zinc oxides obtained by a thermal method for volatilizing galvanization ashes or their mixture, oxidized zinc ores.

Mention may notably be made of methods in which these materials are subject to acid leaching and then optionally to neutralization, which gives the possibility of obtaining after a solid/liquid separation, an aqueous phase in which a zinc salt has been solubilized, an aqueous phase which is subject to extraction with an organic solvent (see for example, U.S. Pat. Nos. 4,124,462, 4,401,531, 4,552,629, 4,572,771, WO-94/28184, U.S. Pat. No. 6,869,520 and US-2004/0031356, as well as E. D. Nogueira et al., Using zinc secondaries to feed an electrowinning plant, in Zinc '85, Proceedings of international Symposium on Extractive Metallurgy Zinc, 1985 and G. Diaz and J. M. Regife, Coping with zinc secondary materials, The modified Zincex route, in Recycling lead and zinc, The Challenge of the 1990's, Rome, 1991).

In these methods, not only zinc is solubilized, but also other hydrolyzable impurities, including i.e. antimony. It has appeared to be impossible to efficiently separate antimony from zinc during the extraction process with an organic solvent. Now, if antimony is present at contents of more than 0.010 mg/l in the electrolyte of the electrolysis cell, this element will represent an actual poison for deposition of zinc. The faradic yield strongly decreases, since hydrogen and serrated zinc which does not adhere to the aluminum cathodes, are produced. These aforementioned methods of the state of the art are therefore not suitable if the zinc-bearing raw material contains antimony.

In other methods, it is intended to carry out neutral leaching at a pH value at which a certain number of significant impurities, including iron, but also bismuth and arsenic, are not or only very lithe solubilized (see U.S. Pat. No. 4,124,462 and BE-1015805). However, the yield of leaching of zinc from the raw material is unfavorably reduced.

Finally, it has appeared that, in most of the aforementioned methods, removal of chlorides and fluorides is imperfect, which for example forces costly draining of the electrolyte to be carried out, enormous amounts of acids being required for washing the zinc-loaded organic liquid phase of the extraction process. Chlorides pose corrosion problems at the lead anodes of the electrolysis and excessive presence of fluorides has the effect of a too strong adherence of zinc on the aluminum cathode. As far as possible, it must therefore be imperatively prevented that the substances reach the electrolyte.

The object of the present invention is therefore to propose a method for producing metal zinc from any zinc-bearing solid raw material containing antimony, and this preferably even if the latter possibly contains non-negligible contents of chlorides and fluorides.

In order to solve these problems, according to the invention, application of a method as indicated at the beginning is provided, the method further comprising
- leaching a zinc-bearing solid raw material with a slightly acid aqueous solution, at a pH value maintained above 3 and less than or equal to 5, forming a suspension in which an aqueous phase contains a main fraction of the zinc from the raw material, which has passed in the solution, and a solid phase contains a residual fraction of this zinc as well as impurities like antimony,
- drawing off from this suspension, said aqueous phase containing zinc in solution and exposing this aqueous phase to said extraction step,
- additional leaching of the suspension subsisting after said drawing-off with an acid aqueous solution, at a pH value maintained below 3.5 and greater than or equal to 1, with formation of an aqueous pulp in which a liquid phase contains, solubilized, said residual fraction of the zinc from the raw material, and impurities like antimony,
- introducing a neutralizing agent into the liquid phase of this aqueous pulp with the obtaining of coprecipitation of impurities like antimony, and
- solid/liquid separation in this neutralized pulp with the obtaining of a zinc-bearing aqueous solution which is recycled to said step for leaching of the zinc-bearing solid raw material.

This method provides very efficient control of the antimony content of the aqueous phase containing zinc in solution to be subject to the extraction step. Actually, during the first leaching, which may be called a neutral leaching, this element is extremely little solubilized and the obtained content may be less than 0.2 mg/l in the aqueous phase containing zinc to be subject to liquid-liquid extraction. Advantageously, this gives the possibility of reaching, after liquid-liquid extraction, in the step for recovering the zinc which occurs by electrolysis, an antimony content of the order of 0.02 mg/l in the solution feeding the electrolysis. With this feeding content, the antimony content in the electrolyte present in the electrolysis cell is less than 0.01 mg/l.

Advantageously, the method according to the invention further comprises, before the leaching step,
- prewashing of the zinc-bearing soluble material with an aqueous solution of an alkaline basic reagent, with solubilization of chlorides and fluorides,
- removal of the solubilized chlorides and fluorides, and
- said step for leaching the prewashed zinc-bearing solid raw material.

This method thus proposes removal of solubilized chlorides and fluorides during prewashing and therefore in this way it allows less costly washing of the zinc-loaded organic liquid phase, obtained during extraction. During this prewashing, advantageously, the zinc-bearing raw material in the form of dust is mixed with water for removing the soluble elements. In the presence of the alkaline basic reagent, the chlorides and fluorides are separated from their metal counter-ion by a metathesis reaction and are thus solubilized, according to the following reaction:

$$MeCl_2 \text{ (soluble)} + Na_2CO_3 \text{ (soluble)} \rightarrow MeCO_3 \text{ (solid)} + 2NaCl \text{ (soluble)}$$

wherein Me=Zn, Pb, Ca, . . .

This reaction therefore allows, while removing for the greater part the chlorides and fluorides, minimization of the zinc loss.

Advantageously, the alkaline basic reagent is selected from the group formed by sodium and potassium oxides, hydroxides and carbonates and mixtures thereof.

The removal of chlorides and fluorides is carried out by means of any suitable separation method, in particular by filtration and washing of the solid materials.

The slightly acid aqueous solution for leaching is, preferably according to the invention, an aqueous medium which contains a weight majority of sulfuric acid. This medium may also contain in the mixture at least one other acid, such as hydrochloric acid. Advantageously, this slightly acid solution at least partly consists of the acid aqueous raffinate from the extraction step.

Feeding the slightly acid solution to leaching is controlled so as to maintain a pH above 3 and less than or equal to 5, i.e. neutral conditions. Advantageously, the pH at the end of leaching is greater than 3.8. Under these conditions, the zinc is gradually leached in the form of water-soluble zinc sulfate, with a yield greater than 80% by weight or more, preferably of the order of 90% by weight, based on the zinc present in the raw material. Moreover, iron and other metal impurities such as antimony, arsenic, bismuth, etc., are not very solubilized.

According to a particular embodiment of the invention, the leaching step comprises addition of iron in the form of a soluble iron compound, for example ferrous sulfate, into the suspension in order to contribute to coprecipitation of iron and of other impurities, as well as maintaining oxidizing conditions in the suspension for causing oxidation of iron and of said other impurities. In this way, the iron and the other metal impurities which are in solution are oxidized and precipitated and the lead is substantially converted into insoluble lead sulfate. The added amount of iron is preferably at least 250 times the amount of antimony contained in the treated zinc-bearing raw materials.

Maintaining oxidizing conditions may be carried out in different ways and notably by bubbling air or oxygen in the obtained suspension and/or by adding a strong oxidizing reagent, such as potassium permanganate.

According to an advantageous embodiment of the invention, the drawing-off step comprises:

decantation of the suspension, optionally in the presence of a flocculating agent, with formation of a clarified supernatant, and filtration of this clarified supernatant with the obtaining of a filtrate forming said aqueous phase containing zinc in solution to be subject to the extraction step. During this decantation, the residual zinc oxide continues to dissolve and to consume acid which has the effect of further increasing the pH and of solubilizing the zinc as much as possible.

As a flocculant, a preferably anionic polyacrylamide may for example be considered. The remaining suspension, i.e. the non-drawn-off suspension is subject to an additional so-called acid leaching.

The acid aqueous solution of the additional leaching is preferably, according to the invention, an aqueous medium which contains a weight majority of sulfuric acid. Advantageously, this acid aqueous solution totally or partly consists of the acid aqueous raffinate from the extraction step. During this additional leaching step, provision may advantageously be made for introducing fresh sulfuric acid in order to compensate for the losses undergone during the process. Feeding of the acid aqueous solution is controlled so as to maintain the pH below 3.5, preferably equal or less than 3, advantageously 2, and greater than 1, i.e., slightly acid conditions. Under these conditions, the residual zinc which has not yet been solubilized, passes into solution in the liquid phase of the pulp and all the lead content of the raw material is recovered in the solid phase of the latter. Other elements also pass into solution, like iron, arsenic, tin, etc., and antimony.

Advantageously, the neutralizing agent introduced into the liquid phase of this pulp may be formed with a portion of prewashed raw material.

The introduction of the neutralizing agent, notably of prewashed raw material, has the effect of again increasing the pH above 3. Under these conditions, the iron and other solubilized impurities in the additional leaching coprecipitate. These impurities for example comprise, lead, silica, aluminum, antimony, tin and/or arsenic. The removal of the solid impurities is routinely carried out for example by filtration.

According to an enhanced embodiment of the invention, the method further comprises, before said step for introducing a neutralizing agent, a solid/liquid separation in the pulp from the additional leaching, with the obtaining of a solid residue containing lead and of said liquid phase containing, solubilized, zinc and impurities, like antimony, and introduction of the neutralizing agent in this liquid phase after this separation. The lead residue is thus removed individually from the circuit before the other impurities.

Advantageously, during the introduction of a neutralizing agent, the method further comprises addition of iron in the form of a soluble iron compound, for example ferrous sulfate, for contributing to said coprecipitation of iron, antimony and other impurities, and maintaining oxidizing conditions in the liquid phase of the aqueous pulp from the additional leaching in order to cause oxidation of the iron and of the other impurities. In particular it is proceeded with this addition when, in this liquid phase of the aqueous pulp, the leached iron content is not sufficient for promoting satisfactory coprecipitation. The oxidizing conditions in this purification are for example obtained by bubbling air or oxygen in the liquid phase and/or by introducing a strong oxidizing reagent, such as potassium permanganate.

It should be understood that each step of the method described above, whether this is leaching, additional leaching and neutralization, may advantageously be carried out in several successive reactors.

The aqueous phase containing zinc in solution, which is drawn off from the suspension obtained during the so-called neutral leaching is, by means of the method according to the invention, widely without impurities which are separable with difficulty during an extraction with an organic solvent, and notably without antimony. On the other hand it may still contain contents, admittedly reduced contents, but to an extent which is still not satisfactory, of chlorides and fluorides, as well as trace amounts of metal elements which should be eliminated.

Also, this aqueous phase is routinely subject to extraction by putting it into contact with an acid organic solvent. The solvent is selected from the group of suitable organic acids for extracting zinc, for example alkylphosphoric, alkylphosphonic and alkylphosphinic acids. Di-(2-ethylhexyl)phosphoric acid ($D_2EPHA$) is preferably used. This extraction agent is preferably diluted in a hydrocarbon, for example kerosene, so as to form a mixture with improved physical characteristics.

During this extraction, customary per se, the acid extraction agent exchanges metal cations such as zinc, for protons, according to the following equation:

wherein R=a monomer of $D_2EHPA$.

The extraction step is routinely carded out and is therefore not described here in detail. During the extraction, the zinc is gradually loaded into the organic liquid phase and this selectively relatively to other metals. Although antimony, tin and iron are preferentially loaded with the zinc in the organic phase, in the method according to the invention, this is no longer critical given that these metals are only at very low contents in the aqueous phase containing zinc in solution which is subject to the extraction. Further it may be noted that the extraction yield of copper, chlorine and fluorine are low, the liquid-liquid extraction therefore representing a good barrier for these elements which in majority remain in the aqueous phase. On the other hand, chemical selection of the extraction process is not complete, as this is known, since there is coextraction of trace amounts of Ca, Cu, Cd, Ni, etc.

The acid aqueous solution which leaves the extraction is called the acid aqueous raffinate. The zinc which it still contains, will be able to be recovered since the raffinate may be recycled into the leaching and additional leaching steps. As extraction of the chlorides and fluorides is very low, it is advantageously possible to recycle a portion of the raffinate to the prewashing step, and this in order to avoid accumulation of hydrochloric acid and of hydrofluoric add in the leaching solution.

According to an advantageous embodiment of the invention, the method comprises
  washing with water the zinc-loaded organic liquid phase of the extraction step, the water from this washing containing residual chlorides and fluorides, and
  add washing of this zinc-loaded organic liquid phase washed with water, with an add aqueous solution containing zinc in solution, the add aqueous solution from this washing containing metal impurities. Given that the optimum conditions required for getting rid of extracted chlorides and fluorides on the one hand and residual metal impurities on the other hand from the organic phase are different, provision was made according to the invention, for washing in two sections.

During the first washing, the organic phase is put into contact with neutral, preferably deionized water, with a small ratio between the organic flow and the aqueous flow (O/A), preferably less than 20. It was observed that a neutral aqueous solution is more favorable for removing chlorides and fluorides. This washing of the chlorides and fluorides with water gives the possibility of also avoiding excessive consumption of sulfuric acid in the method. The washing water containing residual chlorides and fluorides is then advantageously brought back to the step for prewashing the raw material.

During the second washing, the organic phase is preferably put into contact with a zinc sulfate solution in sulfuric acid. For this purpose, the used electrolyte of the electrolysis cell may advantageously be used. The O/A ratio is advantageously greater than 25. During this washing, the zinc and the acid of the aqueous phase extract the metal impurities from the organic phase.

The zinc re-extraction or stripping is carried out in a customary way, as known per se. As an aqueous acid solution, it is possible to use a diluted solution of sulfuric acid, such as the used electrolyte from the electrolysis cell.

According to an embodiment of the invention, the method further comprises regeneration of the organic liquid phase having been subject to said re-extraction and recycling of this organic liquid phase regenerated in the extraction step. The organic phase will actually extract, during the extraction step, iron present in the liquid phase. This iron is not removed from the organic phase during the steps for washing with water and washing with acid. It is therefore preferable to provide a step for regenerating the organic phase which consists of re-extracting the iron in a 6N hydrochloric add aqueous phase.

According to another embodiment of the invention, the method further comprises neutralization of the acid aqueous solution containing metal impurities from the acid washing step, filtration with the obtaining of a filtrate and of a cake, purification of the filtrate with zinc dust, with formation of a cement containing metal impurities, the purified filtrate being recycled to the step for recovering zinc by electrolysis and the filtration cake to the additional so-called acid leaching step. The obtained cement is removed from the circuit.

It should be understood that each of the steps of the extraction, of the washing and of the re-extraction may preferably be carried out in several successive stages and in particular with a counter-current.

Other particularities of the method according to the invention are indicated in the appended claims.

Other details of the invention will become apparent from the exemplary embodiments given hereafter as non-limiting.

FIG. 1 illustrates a flow diagram of an installation for producing zinc applying a method according to Example 1 of the invention.

EXAMPLE 1

Prewashing 1,000 g of a zinc-bearing raw material in the form of dry dusts and containing as impurities i.a. antimony, are fed in 1 to a prewashing installation 2. This material has the following specifications:

TABLE 1

| | |
|---|---|
| Zn | 57.48% by weight |
| Fe | 0.29% by weight |
| Sb | 40 ppm |
| Cu | 580 ppm |
| Cl | 11.15% by weight |
| F | 1,300 ppm |

In this installation, the raw material is mixed with 4,000 of water injected at 3. 100 g of a basic reagent, such as sodium carbonate for example, are introduced at 4 in the formed slurry, which gives rise to the formation of sodium chloride and fluoride which are soluble in water. In the exemplary embodiment, this prewashing installation 2 comprises at least two stirred reactors positioned in a cascade and a solid/liquid separation device, in particular a filter. It is further possible to envision a step for washing with water the filtration cake, into which 2,000 of water may be introduced. The main parameters observed in this prewashing installation are indicated in Table 2 below.

The liquids obtained in the solid/liquid separator and the step for washing with water, are then transferred through conduit 5 to a routine installation for treating effluents 6 in which a separation is carried out between liquid effluents 7 and solid materials 8.

In this way, more than 90% by weight of sodium and potassium chlorides present in the raw material and more than 80% of the fluorides are removed, while less than 1% of the zinc is lost with this operation.

TABLE 2

| pH | 7-10 |
|---|---|
| Temperature | 20-95° C. |
| Density of the slurry | 10-40% by weight of solid mateiral |
| Dwelling time | 0.5-3 h |

The Leaching Circuit

The prewashed zinc-bearing raw material now has the following specifications:

TABLE 3

| Mass | 870 g |
|---|---|
| Humidity level | 41.9% |
| Zn | 69.10% by weight |
| Fe | 0.30% by weight |
| Sb | 49 ppm |
| Cu | 650 ppm |
| Cl | 0.25% by weight |
| F | 170 ppm |

It is transferred through conduit 9 to a leaching installation 10, called neutral leaching. This installation comprises, in this exemplary embodiment, at least two stirred reactors positioned in a cascade. In the illustrated example, 21.5 of a slightly acid aqueous solution which consists of one portion of the aqueous acid raffinate from the extraction step, are introduced at 11 and form a suspension with the prewashed zinc-bearing raw material. This raffinate is mainly formed with sulfuric acid and has the following specifications:

TABLE 4

| $H_2SO_4$ | 38 g/l |
|---|---|
| Zn | 12.5 g/l |
| Fe | 3.8 mg/l |
| Sb | 0.080 mg/l |
| Cu | 474 mg/l |
| Cl | 15.65 g/l |
| F | 84 mg/l |

The main parameters maintained in this leaching installation are indicated in Table 5 below.

TABLE 5

| pH in the first reactor | >3-5 |
|---|---|
| pH in the last reactor | 3.8-5 |
| Temperature | 20-95° C. |
| Density of the suspension | 2-30% by weight of solid material |
| Dwelling time | 0.5-4 h |

In the illustrated example, during this neutral leaching, iron, for example 75 g of ferrous sulfate, and an oxidizing agent, such as potassium permanganate, are introduced at 12.

At a pH from 3 to 5, the zinc passes into solution with a high yield of more than 80%, in the illustrated case of the order of 86.8%, by weight of the zinc in the raw material and the iron as well as the antimony, the arsenic, the bismuth, etc., are oxidized and coprecipitated. The residual chlorides and fluorides are on the other hand carried away in the aqueous phase.

In the exemplary embodiment, the suspension formed is then transferred at 13 to a decantation device 14 including a decanter in which the pH increases up to values from 5 to 5.4. Indeed, the not yet solubilized zinc oxide continues to consume sulfuric acid. A flocculant may advantageously be added, for example an anionic polyacrylamide such as KRF 1210 (Kroff Inc.), in an amount of an addition of 50 g per metric ton of dry solid materials, in order to clarify the suspension. The supernatant portion is then drawn off and passes through a sand filter in order to exclude any passage of solid material into the extraction. 22.3 of filtrate is then obtained, which contains zinc in solution and residual chlorides and fluorides and which is then discharged from the filter through the conduit 15 where it may be optionally separated into two streams. One of these streams passes through the supply conduit 16 of the extraction installation 17 and the other one through an optional purging conduit 18 which then sends back a portion of the filtrate to the prewashing installation 2, so as to maintain, in the aqueous phase containing zinc in solution passing through the supply conduit 16, a chloride content always below 20 g/L.

The remaining non-clarified suspension and therefore not drawn off from the decanter has the following specifications:

TABLE 6

| Mass | 301 g |
|---|---|
| Humidity level | 38.9% |
| Zn | 26.38% by weight |
| Fe | 6.37% by weight |
| Sb | 140 ppm |
| Cu | 500 ppm |
| Cl | 0.44% by weight |
| F | 350 ppm |

It is transferred through the conduit 19 to an additional leaching installation 20, called slightly acid leaching. This installation comprises, in this exemplary embodiment, at least two reactors positioned in a cascade. 4.15 of an acid aqueous solution, which consists of a portion of the aqueous acid raffinate from the extraction step, are introduced at 21 and form a pulp with said remaining, non-clarified suspension. This raffinate therefore has the specifications given in Table 4. In 22, it is possible to envision a supply of fresh sulfuric acid in order to compensate for the acid losses in the process. The conditions observed in this additional leaching installation are indicated in Table 7 below.

TABLE 7

| pH in the first reactor | 1.5 |
|---|---|
| pH in the second reactor | 2.4 |
| Temperature | 20-95° C. |
| Density of the pulp | 22-30% by weight of solid material |
| Dwelling time | 0.5-3 h |

At a pH from 1 to 3, the residual zinc is totally leached and a few impurities (iron, antimony, arsenic, bismuth etc.) are also dissolved. The lead is found in the form of insoluble lead sulfate. In this exemplary embodiment, the additional leaching installation further includes a solid/liquid separation device, for example a filter, which allows recovery of a cake containing lead sulfate. The latter is discharged from the circuit at 23, while the filtrate formed with a zinc-bearing aqueous solution is, in the illustrated example, brought by the conduit 24 into a purification installation 25. This filtrate has the following specifications:

TABLE 8

| | |
|---|---|
| $H_2SO_4$ | 0.2 g/l |
| Zn | 38.6 g/l |
| Fe | 1327 mg/l |
| Sb | 2.4 mg/l |
| Cu | 494 mg/l |
| Cl | 17.85 g/l |
| F | 91 mg/l |

It should be noted that according to the invention it is possible to abandon filtration of the aqueous pulp obtained in the leaching installation 20, in particular when the raw material contains very little or no lead.

The purification installation 25 comprises, in the exemplary embodiment, at least two stirred reactors positioned in a cascade. A neutralizing agent is introduced at 26 in a sufficient amount so as to obtain precipitation of impurities, in the present case, 12.7 g, of the prewashed zinc-bearing raw material. At 27, it is optionally possible to further introduce iron, for example as ferrous sulfate, and an oxidizing agent, such as potassium permanganate. Optionally, air or oxygen may be bubbled in the solution to be purified. All these conditions contribute to oxidation and coprecipitation of the iron and of the other impurities and to reaching a high purification yield. The conditions of the purification emerge from Table 9 below.

TABLE 9

| | |
|---|---|
| pH | 3-4.5 |
| Temperature | 20-95° C. |
| Drying time | 1-6 h |

The iron mainly precipitates as goethite. In the illustrated case, by a solid/liquid separation and without addition of iron, 13.4 g are obtained of a precipitate notably containing iron and antimony, which is discharged from the leaching circuit in 28. The purified zinc-bearing aqueous solution is, through the conduit 53, recycled to the leaching installation 10. It then has the following specifications:

TABLE 10

| | |
|---|---|
| Zn | 42.9 g/l |
| Fe | 162 mg/l |
| Sb | 0.16 mg/l |
| Cu | 481 mg/l |
| Cl | 17.60 g/l |
| F | 75 mg/l |

All these steps in succession during the leaching circuit give the possibility of obtaining in this example, 22.3 of an aqueous phase containing zinc in solution which is drawn off at 15 from the decantation device 14 and which has the specifications given in Table 11 below.

TABLE 11

| | |
|---|---|
| $H_2SO_4$ | 0.1 g/l |
| Zn | 36.1 g/l |
| Fe | 2.8 mg/l |
| Sb | 0.039 mg/l |
| Cu | 498 mg/l |
| Cl | 15.25 g/l |
| F | 82 mg/l |

The limits reached by the leaching circuit according to the invention for iron and antimony are extremely important since these impurities, if they have not been extensively removed in the leaching circuit, would be, like the zinc, loaded into the organic liquid phase during the extraction process. The antimony, which cannot be separated from zinc during the re-extraction, would then reach the electrolyte and would then irremediably pollute it. Iron and other metal impurities such as tin would themselves remain in the organic phase during the re-extraction and would accumulate in the latter, consequently degrading its extraction agent properties.

The Liquid-Liquid Extraction Circuit

In the illustrated exemplary embodiment, the aqueous phase containing zinc in solution (22.3 L) reaches the extraction installation 17 which includes several stages, in which it is put into contact as a counter-current with 42.3 of an organic phase formed with $D_2$ EHPA diluted in kerosene. Each stage customarily comprises a mixing area with stirring where the aqueous phase and the organic phase are intimately put into contact and a decantation area where they separate given their density difference. During the extraction, the ratio between the organic flow and the aqueous flow O/A is comprised between 1 and 4 in order to reach a high transfer of zinc to the organic phase. The temperature is maintained between 20 and 60° C.

This extraction is, as this is known, selective towards many metals. Chloride and fluoride extraction is extremely low. By exchange, a stoichiometric amount of acid is released into the aqueous phase. The aqueous phase flowing out of the extraction stage is therefore acid and is called an acid aqueous raffinate, which is collected in a tank 29 (see Table 4). As this is already indicated, a portion of the raffinate is transferred as a leaching medium to the installation of 10 and 20. As this raffinate contains chlorides, a portion of the latter may also optionally be recycled to the prewashing installation for the raw material through the conduit 30.

However the extraction is not sufficient for totally removing chlorine and fluorine and some trace amounts of metals such as Ca, Cu, Cd, Ni, i.e., and on the other hand, a complete raffinate-organic phase separation cannot be obtained and therefore a portion of the raffinate containing chlorides, fluorides and impurities is carried away by the organic phase.

According to the invention, through a conduit 31, the zinc-loaded organic phase is transferred to a washing installation. It has the following specifications:

TABLE 12

| | |
|---|---|
| Volume | 42.3 l |
| Zn | 13.6 g/l |
| Fe | 6.1 mg/l |
| Sb | 0.019 mg/l |
| Cu | 0.80 mg/l |
| Cl | 0.165 g/l |
| F | 3.0 mg/l |

This washing installation includes two sections.

The first section, called a section for washing with water 32, comprises at least one stage where the organic phase is put into contact with 4.23 of water introduced at 33, i.e. in an O/A ratio of about 10. In the exemplary embodiment, a small amount of a basic agent, for example sodium carbonate may be added to the washing water, which increases the efficiency of the washing of the halides and reduces possible carrying-away of the zinc. The washing water containing the halides is discharged and transferred through the conduit 34 to the prewashing installation 2 for the raw material.

The zinc-loaded organic phase, washed with water, has the following specifications:

TABLE 13

| | |
|---|---|
| Volume | 42.3 l |
| Zn | 13.6 g/l |
| Fe | 5.9 mg/l |
| Sb | 0.010 mg/l |
| Cu | 0.60 mg/l |
| Cl | 0.014 g/l |
| F | 0.5 mg/l |

It is then transferred through the conduit 35 to the second section, called an acid washing section 36. This section comprises at least one stage where the organic phase is put into contact with 2.04 of an acid zinc-bearing solution, in the illustrated case, used electrolyte supplied at 37 and diluted with water introduced at 38 so as to avoid precipitation of gypsum when calcium is carried away. The O/A ratio is 35 for example. The acid aqueous solution from the acid washing section 36 and containing the metal impurities is discharged through the conduit 39 so as to be optionally brought to a subsequent treatment.

The zinc-loaded organic liquid phase after the acid washing has the following specifications:

TABLE 14

| | |
|---|---|
| Volume | 42.3 l |
| Zn | 13.1 g/l |
| Fe | 5.9 mg/l |
| Sb | 0.010 mg/l |
| Cu | 0.20 mg/l |
| Cl | 0.009 g/l |
| F | 0.3 mg/l |

It is then transferred through the conduit 54 to the re-extraction installation 40 which includes at least one stage, in which it is put into contact in a known way with 13.6 of an acid aqueous solution, in this case the used electrolyte introduced at 41. The O/A ratio is comprised between 2 and 10 and ensures a high zinc transfer yield to the electrolyte, preferably of more than 90% by weight.

The organic phase reloaded with protons may then be recycled through the circuit 42 to the extraction installation 17. Advantageously, in this circuit, provision may be made for customarily regenerating the organic phase.

The Electrolysis

In a conventional way, the zinc-loaded aqueous solution leaving at 55 the re-extraction installation 40 is supplied to a customary cell for electrodeposition of metal zinc 43. It has the following specifications:

TABLE 15

| Solution feeding the electrolysis | | Electrolyte |
|---|---|---|
| Volume | 13.6 l | 13.6 l |
| $H_2SO_4$ | 115 g/l | 175 g/l |
| Zn | 91.1 g/l | 50.8 g/l |
| Fe | 1.1 mg/l | 0.8 mg/l |
| Sb | 0.015 mg/l | 0.005 mg/l |
| Cu | 0.35 mg/l | 0.3 mg/l |

TABLE 15-continued

| Solution feeding the electrolysis | | Electrolyte |
|---|---|---|
| Cl | 0.26 g/l | 0.24 g/l |
| F | 23 mg/l | 24 mg/l |

The acid aqueous solution from the acid washing section 36 may advantageously be subject in the device 44 to neutralization by the prewashed raw material introduced at 45 and to filtration. The filtration cake obtained at 46 may be recycled to the additional so-called acid leaching installation 20. The filtrate is transferred through the conduit 47 to a purification device 48 in which zinc dust is conventionally introduced at 49 into a stirred reactor in order to cause precipitation of the metal impurities by reduction to the metal state. The purified solution is filtered and transferred through the conduit 50 to the electrodeposition cell 43 while a cement is discharged at 51.

The metal zinc obtained in the cell 43 is then transferred in a known way to the installation 52 where it is subject to melting and casting operations.

When the different steps of the method according to the invention are reviewed, it is observed that the liquid-liquid extraction is highly selective towards copper and that the step for washing with water is very efficient for removing chlorine and fluorine residues. For antimony, none of the different steps of the liquid-liquid extraction circuit is selective, the distribution of antimony among both organic and aqueous phases being of the order of 50% in a series of steps and of 0% for the acid washing. This circuit is therefore not a barrier for antimony and it is necessary to control the latter beforehand, in the leaching circuit.

EXAMPLE 2

The steps of the leaching circuit of Example 1 are reproduced but by applying a final pH of 1.5 in the last reactor of the additional so-called acid leaching.

When the pH is thereby lowered, an increase in the zinc leaching yield and strong dissolution of iron and antimony are observed. As regards the latter, the leaching yield passes from 7.8% to 84.8%. A significant weight loss of the final cake occurs, and the lead content of the latter passes from 38% by weight for the leaching at a pH of 2.4 to 60% by weight at a pH of 1.5. Therefore from an economical point of view it is more interesting to operate at a lower pH, since more value will be obtained from the lead residue and the zinc recovery yield will be improved. However, the possibility of reprecipitating antimony is required for controlling its content in the neutral leaching solution, which may, according to the invention be obtained by purification during the step for introducing a neutralizing agent.

EXAMPLE 3

In two tests, the steps of the leaching circuit of Example 1 are reproduced. The conditions applied in the purification step are the following:

Test 1
Addition of finely milled limestone up to a final pH of 4.2
Temperature: 60° C.
Drying time: 4 h
Bubbling of air as an oxidizer
Test 2
Addition of prewashed zinc-bearing raw material up to a final pH of 3.8

Temperature: 40° C.
Drying time: 4 h
Bubbling of air as an oxidizer

While in both cases, practically complete precipitation of the iron is observed, the precipitation of antimony is only 60% with limestone as a neutralizing agent while it is practically total with the prewashed zinc-bearing raw material. This result per se is surprising, since it is impredictable.

It should be understood that the present invention is by no means limited to the embodiment described above and that many modifications may be made thereto without departing from the scope of the appended claims.

I claim:

1. A method for producing metal zinc, comprising the steps of:
    a step for neutral leaching wherein a zinc-bearing solid raw material consisting of electric arc oven dusts, of impure zinc oxide obtained by a thermal method for volatilizing galvanization ashes, oxidized zinc ores or mixtures thereof undergoes neutral leaching with an aqueous solution, at a pH value maintained greater than 3.8 and less than or equal to 5, with formation of a suspension in which an aqueous phase contains a main fraction of the zinc of the raw material, which has passed into solution, and a solid phase contains a residual fraction of this zinc as well as antimony and other impurities, the step for neutral leaching comprising an addition of iron, as a soluble iron compound, into the suspension for contributing to coprecipitation of iron, antimony, and other impurities as well as maintaining oxidizing conditions in the suspension for causing oxidation of the iron and of antimony and said other impurities,
    a drawing-off step wherein said aqueous phase containing zinc in solution is drawn off from said suspension and exposing the zinc in solution to an extraction step, wherein the zinc in solution is extracted from the aqueous phase with an acid organic solvent, with formation of a zinc-loaded organic liquid phase and of an acid aqueous raffinate,
    an additional leaching step wherein the remaining suspension is leached after said drawing-off with an acid aqueous solution, at a pH value maintained below 3.5 and greater than or equal to 1, with formation of an aqueous pulp in which a liquid phase contains, solubilized, said residual fraction of the zinc of the raw material, iron, antimony, and other impurities,
    a step for introducing a neutralizing agent wherein a neutralizing agent is introduced into the liquid phase of this aqueous pulp with the obtaining of coprecipitation of iron, antimony, and other impurities,
    a solid/liquid separation in this neutralized pulp, with the obtaining of a zinc-bearing aqueous solution which is recycled to the step for neutral leaching the zinc-bearing solid raw material,
    re-extraction of the zinc from the zinc-loaded organic liquid phase, by means of an acid aqueous solution, and
    recovery of the re-extracted zinc from the acid aqueous solution by electrolysis.

2. The method according to claim 1, comprising before the step for neutral leaching,
    a prewashing step wherein the zinc-bearing solid raw material is prewashed with an aqueous solution of an alkaline basic reagent, with solubilization of chlorides and fluorides, and
    removal of the solubilized chlorides and fluorides, with formation of a prewashed zinc-bearing solid raw material to be subject to said step for neutral leaching.

3. The method according to claim 2, wherein the alkaline basic reagent of the prewashing step is selected from the group formed by sodium and potassium oxides, hydroxides and carbonates, and mixtures thereof.

4. The method according to claim 2, wherein the neutralizing agent is formed with a portion of the prewashed zinc-bearing raw material.

5. The method according to claim 2, wherein a portion of the acid aqueous raffinate is recycled to the prewashing step.

6. The method according to claim 1, wherein the aqueous solution of the neutral leaching step at least partly consists of the acid aqueous raffinate from the extraction step.

7. The method according to claim 1, wherein the iron is added in an amount at least equal to 250 times the amount of antimony contained in the zinc-bearing raw material.

8. The method according to claim 1, wherein the drawing-off step comprises the steps of:
    decantation of the suspension with formation of a clarified supernatant, and
    filtration of this clarified supernatant with the obtaining of a filtrate forming said aqueous phase containing zinc in solution to be subject to the extraction step.

9. The method according to claim 1, wherein the acid aqueous solution of the additional leaching at least partly consists of the acid aqueous raffinate of the extraction step.

10. The method according to claim 1, comprising, before said step for introducing a neutralizing agent, a solid/liquid separation in the pulp from the additional leaching, with the obtaining of a solid residue containing lead and of said liquid phase containing, solubilized, zinc, iron, antimony, and other impurities, and introduction of the neutralizing agent into this liquid phase before this separation.

11. The method according to claim 1, comprising, during the introduction of a neutralizing agent, an addition of iron, as a soluble iron compound, in order to contribute to coprecipitation of iron, of antimony and of other impurities as well as maintaining oxidizing conditions in the liquid phase of the aqueous pulp from the additional leaching, in order to cause oxidation of the iron and of said other impurities.

12. The method according to claim 1, further comprising the steps of:
    washing with water the zinc-loaded organic liquid phase from the extraction step, the water from this washing containing residual chlorides and fluorides, and
    acid washing this zinc-loaded organic liquid phase, washed with water, with an acid aqueous solution containing zinc in solution, the acid aqueous solution from this washing containing metal impurities.

13. The method according to claim 12, wherein, during said washing with water, a ratio between organic flow and aqueous flow of less than 20 is maintained.

14. The method according to claim 12, wherein, during said acid washing with an acid aqueous solution containing zinc in solution, a ratio between organic flow and aqueous flow of more than 20 is maintained.

15. The method according to claim 12, wherein the washing water containing residual chlorides and fluorides is at least partly recycled to the prewashing step.

16. The method according to claim 12, further comprising neutralization of the acid aqueous solution containing metal impurities from the acid washing step, filtration with the obtaining of a filtrate and of a cake, purification of the filtrate with zinc dust, with formation of a cement containing metal impurities, the purified filtrate being recycled to the zinc recovery step and the filtration cake to the additional leaching step.

17. The method according to claim 1, further comprising regeneration of the organic liquid phase having been subject to said re-extraction and recycling of this organic liquid phase regenerated in the extraction step.

18. The method according to claim 1, wherein the acid aqueous raffinate consists of a majority weight of sulfuric acid.

\* \* \* \* \*